United States Patent [19]

Magnusson

[11] 3,965,002
[45] June 22, 1976

[54] PROCESS FOR REDUCING DISSOLVED INORGANIC ORTHOPHOSPHATES TO PPB LEVELS IN AQUEOUS SYSTEMS

[75] Inventor: Lawrence B. Magnusson, Langhorne, Pa.

[73] Assignee: Betz Laboratories, Inc., Trevose, Pa.

[22] Filed: Nov. 12, 1975

[21] Appl. No.: 631,335

Related U.S. Application Data

[63] Continuation of Ser. No. 564,582, April 2, 1975, abandoned, which is a continuation-in-part of Ser. No. 456,720, April 1, 1974, abandoned.

[52] U.S. Cl. .................................................. 210/46
[51] Int. Cl.² .......................................... C02C 1/40
[58] Field of Search .................. 210/42, 45, 46, 47, 210/49, 52, 51; 423/158, 308

[56] References Cited
UNITED STATES PATENTS

3,716,484  2/1973  Lincoln et al. ..................... 210/52

OTHER PUBLICATIONS

Ferguson et al. "Calcium Phosphate Precipitation At Slightly Alkaline pH Values," Journal W.P.C.F. vol. 45, No. 4 Apr. 1963 pp. 620–631.

Primary Examiner—Charles N. Hart
Assistant Examiner—Benoit Castel
Attorney, Agent, or Firm—Alexander D. Ricci; Steven H. Markowitz

[57]  ABSTRACT

A continuous, steady-state process for precipitating dissolved orthophosphate from an aqueous system, wherein a slurry of seed crystals of calcium phosphate, formed under critical conditions, is introduced into a reactor region, the phosphate-containing water is fed into the region under certain conditions of pH and calcium content, and the dissolved phosphates are precipitated at a rate equal to the feed rate, such that the residual dissolved phosphorus level of the treated water is below 50 parts per billion.

8 Claims, 4 Drawing Figures

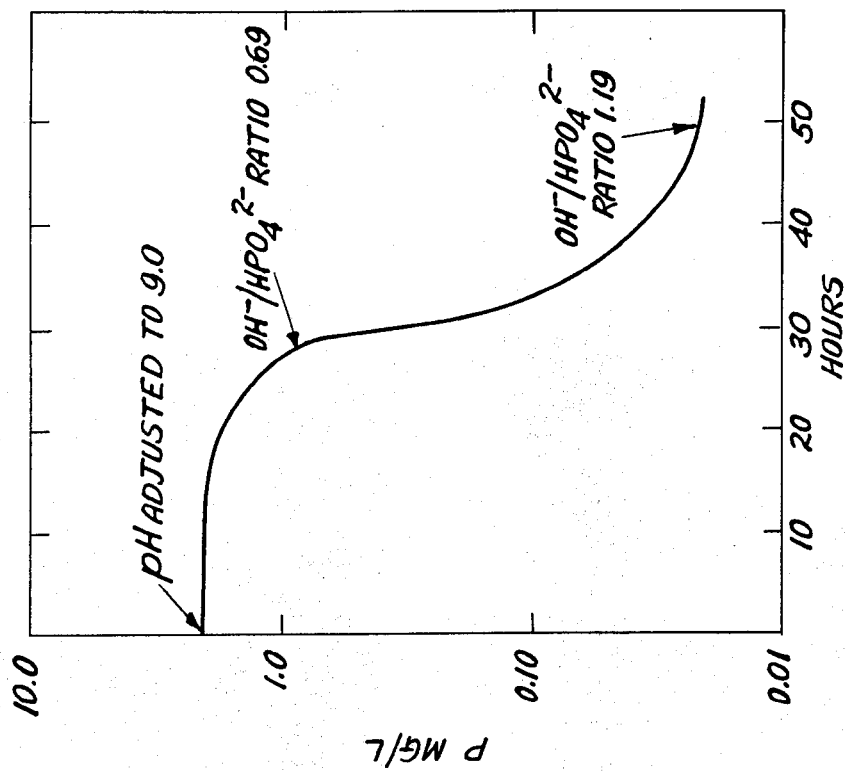
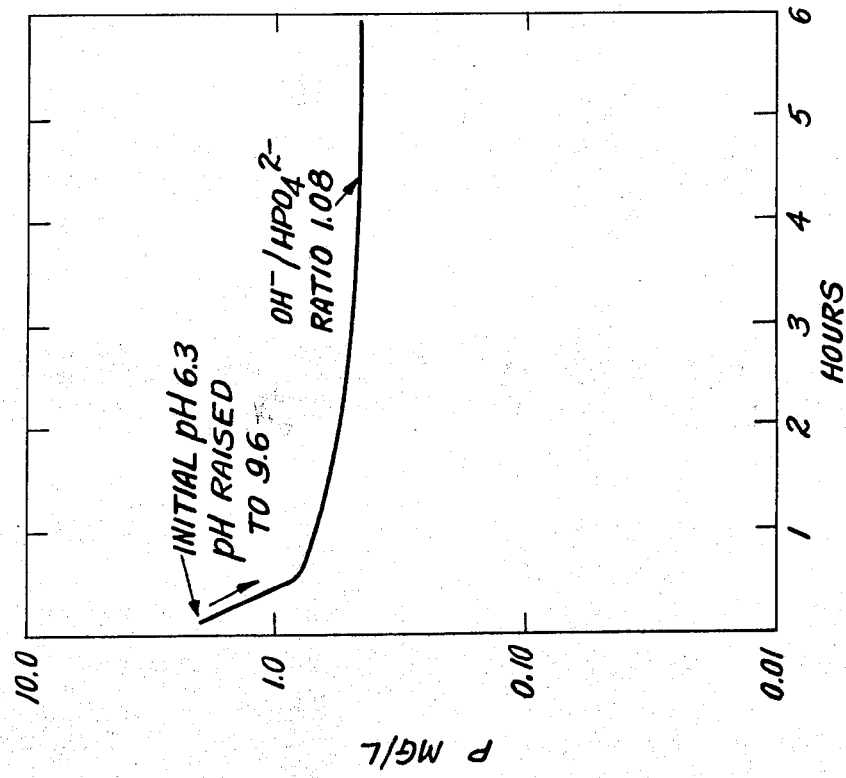

PROCESS FOR REDUCING DISSOLVED INORGANIC ORTHOPHOSPHATES TO PPB LEVELS IN AQUEOUS SYSTEMS

This is a continuation of application Ser. No. 564,582, filed Apr. 2, 1975 which is a continuation-in-part of application Ser. No. 456,720, filed Apr. 1, 1974 and now both abandoned.

BACKROUND OF THE INVENTION

The prior art processes for the economical, large scale removal of soluble phosphate from supply, waste, or reusable waters are concerned with the precipitating agents lime, alum, and iron salts. The lime processes have been developed with a minimum of understanding and investigation of the basic chemical properties of calcium phosphate systems. These processes do not achieve the efficiency which might be expected. The inherent solubilities of iron and aluminum phosphates are relatively high, such that residual phosphate of the order of 1 mg/liter is left in solution. To prevent eutrophication of streams and lakes the best available evidence shows that soluble phosphate must be well below 0.1 mg/liter. Iron salts are economical only near a source of waste pickling liquor. Hydrous ferric oxide has a tendency to carry through a treatment process, coloring the effluent. Aluminum ion and oxide have debilitating effects on fish.

DESCRIPTION OF THE DRAWINGS

FIG. 1 is a graph representing the precipitation of calcium phosphate at pH 9.6 with no seed crystals. The apparently soluble phosphate (as phosphorus) is plotted on the vertical axis. Initial concentrations: $6.75 \times 10^{-5}$ molar $H_2PO_4^-$, $1.25 \times 10^{-3}$ molar $Ca^{2+}$. The pH was raised to and maintained at 9.6 by the addition of $Ca(OH)_2$ solution.

FIG. 2 is a graph representing the precipitation of calcium phosphate at pH 9.0 with no seed crystals. Initial concentrations: $6.75 \times 10^{-5}$ molar $H_2PO_4^-$, $1.25 \times 10^{-3}$ molar $Ca^{2+}$. The pH was raised to and maintained at 9.0 by the addition of $Ca(OH)_2$ solution.

DESCRIPTION OF THE INVENTION

Figure 4:
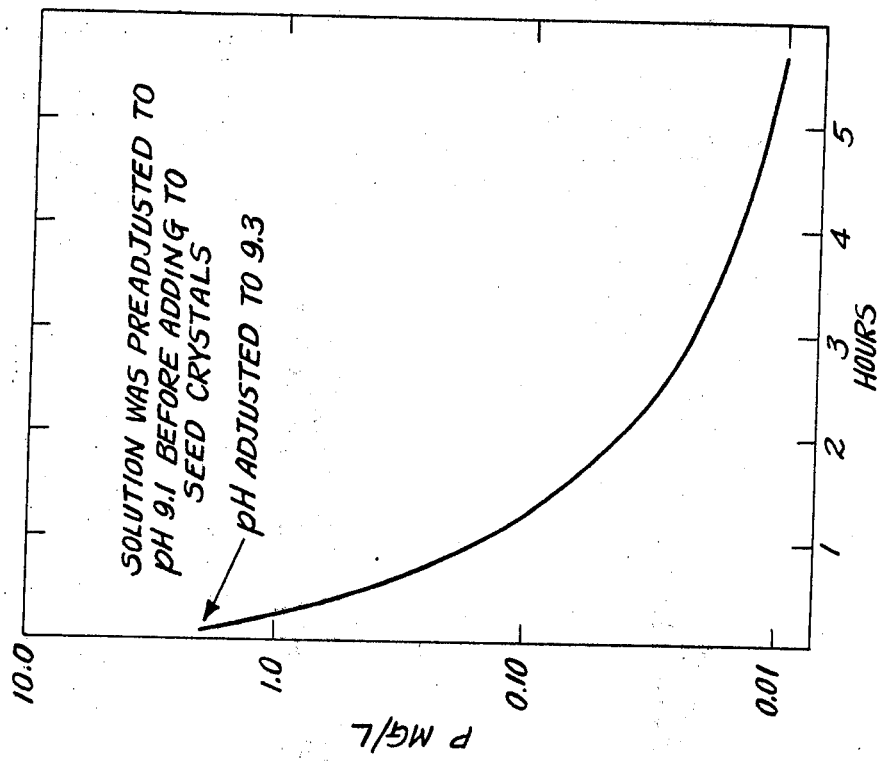
FIG. 4 is a graph representing the precipitation of calcium phosphate at pH 9.3 with 19 mg (as P) phosphate seed crystals per liter. Initial concentrations: $6.75 \times 10^{-5}$ molar $H_2PO_4^-$, $1.25 \times 10^{-3}$ molar $Ca^{2+}$.

It is an object of the invention to provide a process which is capable of removing dissolved orthophosphate to low parts per billion levels. It is a further object that the process shall be as rapid and as economical as possible to minimize the reactor and holding capacities and the chemical requirement.

The inventor has discovered a process for reducing dissolved orthophosphate levels to amounts less than 10 parts per billion (expressed as weight of elemental phosphorus) in times at least as short as seventeen minutes (retention time in the reactor). The principle of the process is based on the discovery that contacting water containing calcium and phosphate ions with a certain preexisting, insoluble phase of calcium phosphate will cause further rapid crystal growth and nucleation of additional, similarly insoluble calcium phosphate providing that rather strictly defined conditions are fulfilled.

In the research which resulted eventually in the discovery, the author learned that the composition of solid calcium phosphate precipitated at pH values above 7 could vary over a wide range, depending upon the ionic concentrations, the time of solid-solution contact, and the nature of already-present calcium phosphate solid, if any.

Thus, the precipitation reactions are represented by the following equations as, e.g.,

| | Equations | $OH/HPO_4^{2-}$ |
|---|---|---|
| (1) | $8\ Ca^{2+} + 6\ HPO_4^{2-} + 4\ OH^- = Ca_8H_4(OH)_2(PO_4)_6 + 2\ H_2O$ | 0.66 |
| (2) | $9\ Ca^{2+}\ 6\ HPO_4^{2-} + 6\ OH^- = Ca_9H_2(OH)_2(PO_4)_6 + 4\ H_2O$ | 1.00 |
| (3) | $19\ Ca^{2+} + 12\ HPO_4^{2-} + 14\ OH^- = Ca_{19}H_2(OH)_4(PO_4)_{12} + 10\ H_2O$ | 1.17 |
| (4) | $10\ Ca^{2+} + 6\ HPO_4^{2-} + 8\ OH^- = Ca_{10}(OH)_2(PO_4)_6 + 6\ H_2O$ | 1.33 |
| (5) | $21\ Ca^{2+} + 12\ HPO_4^{2-} + 18\ OH^- = Ca_{21}H_2(OH)_8(PO_4)_{12} + 10\ H_2O$ | 1.50 |

The phosphate species is written as the monohydrogen phosphate ion since this is the dominant species in the pH range 9–10.5. These stoichiometries are derived from analytical observations that the $OH/HPO_4$ ratio, that is, the ratio of hydroxide ion removed from solution to the monohydrogen phosphate ion removed, varied from 0.67 to 1.50, depending upon conditions and times of reaction. As an incidental point, the formulas of the solids are written as analogues of hydroxyapatite (eq. 4) because there is some evidence leading one to believe that the compositions are changed by substituting two protons for one calcium ion in the crystal lattice. Other formulas, of course, can be written to satisfy the observed stoichiometries.

In the absence of any solid phase a supersaturated solution of calcium and phosphate ions reacts invariably to form relatively soluble solid phases for which the $OH/HPO_4$ reaction ratio is less than 1.17 and the $Ca/PO_4$ ratio in the solid is less than 1.58, as in reactions (1) and (2) above. An example of this precipitation behavior is shown in FIG. 1. The $OH/HPO_4$ reaction ratio was 1.08 in this run. As can be seen in FIG. 1 the non-filterable phosphate level had not decreased below 0.45 mg/liter after 6 hours of observation. Similarly, in the presence of any solid phase, or part thereof, in which the $OH/HPO_4$ reaction ratio is less than 1.17, the supersaturated solution will react to form a relatively soluble solid phase.

The solubility of phosphate depends upon, and is controlled by, the composition of the most soluble phase.* Thus, if any one of the solid phases with the compositions represented by equations 3–5 is the only solid phase present, the solubility of phosphate will be in the low ppb range, at pH 9 with 50 mg/liter $Ca^{2+}$ excess, within a few minutes after formation of the solid. A low solubility will also prevail with any mixture of these compositions. On the other hand, if a solid is formed with OH/HPO$_4$ ratio less than about 1.17 (as in eq. 1), the solubility increases to near the ppm range. Futhermore, the solubility of a mixture of the eq. (1) or (2) composition with any of the others will be controlled by the eq. (1) or (2) composition. The conversion of the eq. (1) or (2) composition to more stable forms is very slow.

*Solubility here is intended to mean an ionic concentration observed within minutes to hours following solid formation. This "solubility" is always greater than the equilibrium solubility.

Thus, if one attempts to run a continuous process with eq. (1) or (2) solid present in the reactor the solubility will never decrease below the ppm range because the new precipitating solid will have a composition near that given by eq. (1).

The author's concepts, therefore, were to form the less soluble (ppb) solid phases and to use them as seed crystals for the nucleation and/or crystal growth of additional solid with similarly low solubility, thus bypassing the normal formation of the more soluble solid phase. It was anticipated that the rate at which dissolved phosphate could be removed would depend upon the available surface of the seed crystals. Before a practical removal rate can be achieved it is necessary to form a sufficient amount of the low solubility solid. This was accomplished by repeating batch operations as is detailed in the examples under Specific Embodiments.

GENERAL EMBODIMENT

Generally the invention entails two aspects, i.e.,
1. the preparation of seed crystals of relatively insoluble calcium phosphate and
2. The use of the seed crystals in a continuous process directed to the removal of dissolved phosphate from an aqueous medium.

The relatively insoluble solid phase of calcium phosphate which can act as the seeding agent for the rapid removal of orthophosphate from solution by the nucleation and/or crystal growth of additional, similarly insoluble calcium phosphate is critical to the overall process. In the absence of this relatively insoluble phase, calcium and phosphate ions in supersaturated solution normally combine rapidly to produce a relatively soluble phase of calcium phosphate. In the presence of sufficient quantities of the relatively insoluble phase, the formation of any significant quantity of the relatively soluble phase is bypassed, or prevented. The solid-solution reactions are not generally at thermodynamic equilibrium but the apparent solubilities are associated with a rather definite limiting ratio for the calcium and phosphate contents of the solid phase. The relatively soluble phase has a calcium to phosphate mole ratio of less than 1.58. The relatively insoluble phase has a calcium to phosphate mole ratio equal to or greater than 1.58. As examples of the observed solubilities of these two types of solids, at pH 9.0 with 50 mg/liter of free, excess calcium ion in solution at 24°C, the phosphate solubility of the low Ca/PO$_4$ solid is about 1 ppm (as phosphorus) while the phosphate solubility of the high Ca/PO$_4$ solid is 10 ppb or less. The method for producing the relatively insoluble calcium phosphate involves a spontaneous nucleation from homogeneous, supersaturated solution, as follows:

a. Adding to water containing a known amount of dissolved orthophosphate an amount of soluble calcium such that the molar ratio of calcium to phosphorus is from about 1.5 to about 1.75, plus at least about 8 milligrams per liter of calcium per liter of calcium in excess of said amount.
b. Maintaining the pH of said water between 8.5 and 9.5 by adding calcium hydroxide solution (as needed) with continuous stirring.
c. Maintaining the temperature of the water at or below 30°C.
d. Allowing the dissolved orthophosphate to nucleate and to begin precipitating in the form of calcium phosphate solid.
e. Monitoring the composition of the solid and progress of the reaction by suitable analyses.

A suggested, though not exclusive method, is to analyze for phosphate in a filtered sample of solution. When the soluble phosphate has decreased to low ppb range, the composition of the solid will be that of the relatively insoluble form (Ca/PO$_4$ greater than 1.58). A supplementary monitor is to measure the moles of calcium hydroxide added (at constant pH) and relate the OH added to the phosphate removed. The initial calcium phosphate precipitating will tend to have the composition of the relatively soluble phase. Given enough time, this solid phase reacts with the solution and converts to the relatively insoluble phase.

To accumulate a certain required amount of solid for continuous processing, the batch process is simply repeated or a continuous process may be begun with the first batch of seeds in the reactor, taking care that the limits for continuous steady-state processing are not exceeded.

The method for the continuous removal of dissolved orthophosphate from an aqueous medium comprises:

a. Charging a reactor region with a slurry of relatively insoluble calcium phosphate, prepared as described above.
b. Introducing into the region a continuous flow of the aqueous medium to be treated.
c. Maintaining the pH in the region between 9.0 and 10.5 by adding calcium hydroxide solution as required for the precipitation reaction.
d. Maintaining the soluble calcium content of the water within the reactor region at a level where the calcium to influent phosphorus molar ratio is between 1.5 and 1.75 plus at least 0.2 millimoles calcium per liter excess.
e. Establishing a steady-state of approximately constant concentration (ppb) of soluble phosphate by maintaining the ratio of the phosphate input rate to charged crystal amount at $1.5 \times 10^{-3}$ or less, where the input rate is expressed as moles of phosphorus per minute per liter of reactor volume and the charged crystal amount is defined as moles of phosphorus per liter of reactor volume. In the steady-state the precipitation of phosphate is equal to the input rate.
f. Settling or otherwise separating the calcium phosphate particles in the effluent from the reactor region and returning the particles to the reactor region at a rate such that the reactor seed concentration remains at a value adequate for the maintenance of a parts per billion steady-state concentration of soluble phosphate.

SPECIFIC EMBODIMENTS

The operation of a large scale reactor was simulated by using a 12-liter, 5-necked flask. The center port contained a motor-driven, slow speed propeller stirrer operating through a mercury seal. The other ports contained phosphate and saturated calcium hydroxide solution inputs, $CO_2$-free air input, pH electrode, vent, and solution grounding wire. Auxiliary equipment included calibrated carboys and buret for the calcium hydroxide solution, and a calibrated cylindrical vessel to supply phosphate solution via a peristaltic pump. The pH electrode, calibrated periodically with buffers established by the National Bureau of Standards, was connected to a pH meter having an analog output which was monitored by a strip chart recorder and controller. The latter, according to its set point, actuated a solenoid valve on the calcium hydroxide supply to maintain the pH at a constant value. The reactor and solution supply vessels were shielded from the atmosphere by a flow of $CO_2$-free air. All water (deionized) was boiled and shielded from atmospheric $CO_2$ to facilitate accurate monitoring of reaction stoichiometries.

Samples (45ml) for the determination of soluble phosphate were drawn by pipet from the reactor and filtered through 0.2 micron pore size membrane filters. The sampling and filtering operation required about 20 seconds. The operation was simplified by omitting an effluent stream; i.e., no solution, other than samples, was drawn from the reactor. The initial volume of solution in the reactor was 9 liters, leaving room for the addition of 2 to 3 liters of feed solution. It may be shown mathematically that the presence or absence of an actual effluent stream has a negligible effect upon steady-state conditions. Phosphate determination was by the method of Murphy and Riley. Room and solution temperatures were monitored periodically and were in the range 22°–26°C. Crystals of calcium phosphate prepared at controlled temperatures above 30° were not effective in promoting rapid crystallization. Temperatures which were found acceptable range from just above freezing of the water medium to and including 30°C. The source of phosphate ion was reagent grade phosphoric acid diluted to a 0.1 molar stock solution or potassium dihydrogen phosphate. The phosphate and hydrogen ion contents were determined by titration with calcium hydroxide solution which in turn was standarized against potassium hydrogen phthalate. For the preparation of phosphate crystals an aliquot of the stock acid was diluted to 1 liter.

Examples of the preparation of starting seed crystal material follow:

EXAMPLE 1

Calcium nitrate solution was added to provide 50 mg/liter $Ca^{2+}$ to 11 liters of water containing 2 parts per million (as phosphorus) of dissolved orthophosphate. The pH was adjusted to and maintained at 9.0 by adding $Ca(OH)_2$ solution. FIG. 2 shows the progress of the reaction. No precipitation occurred for about 10 hours. Following this induction period calcium phosphate began to form and the soluble phosphate decreased. At 50 hours the soluble phosphate had decreased to 0.022 mg/liter (as P). The $OH/HPO_4$ reaction ratio had increased to 1.19 at 50 hours as noted in FIG. 2. The supernatant solution was removed from the settled crystals which were used as seed crystals for the formation of additional seed crystals.

EXAMPLE 2

Figure 3:
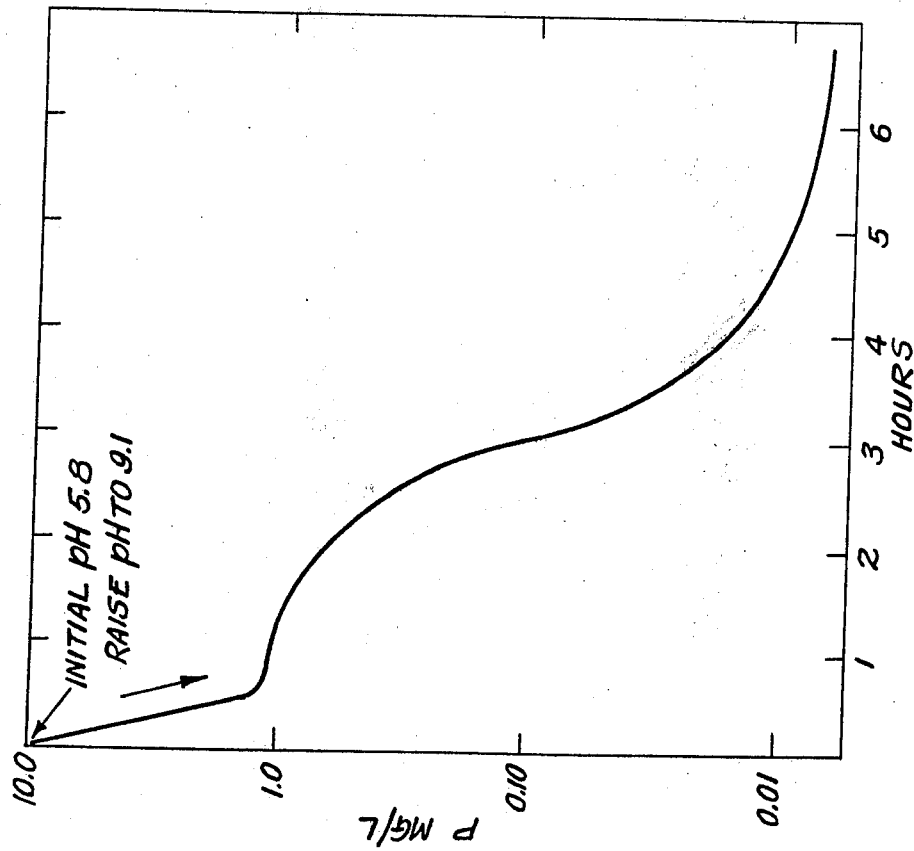
FIG. 3 is a graph representing precipitation of calcium phosphate at pH 9.1 with 21 mg (as P) phosphate seed crystals per liter. Initial concentration: $3.55 \times 10^{-4}$ molar $H_2PO_4^-$, $1.25 \times 10^{-3}$ molar $Ca^{2+}$. The pH is maintained at 9.1 by adding $Ca(OH)_2$ solution.

Calcium nitrate solution was added to provide 50 mg/liter $Ca^{2+}$ to 11 liters of water containing 10 parts per million (as phosphorus) of dissolved orthophosphate. The pH was maintained at 9.1. 21 mg of phosphate (as P) per liter as seed crystals as made in accordance with Example 1 were added before raising the pH. The fast, initial drop in phosphate concentration is caused by a combination of formation of a low solubility phase and of a higher solubility phase, the latter showing its presence by the shoulder on the solubility curve at about 1 mg P/liter (FIG. 3). This phase eventually converts to the low solubility phase (<0.01 mg P/liter).

EXAMPLE 3

If the initial concentration of soluble phosphate is not too high, the spontaneous nucleation to form a relatively soluble phase (as in FIG. 3) is largely eliminated. FIG. 4 shows the course of a reaction similar to that in Example 1 except that 19 mg seed (P) per liter were present. The pH was 9.3. No shoulder is observed in FIG. 4, indicating that little, if any, of the relatively soluble phase was formed.

From the examples provided above and numerous others performed it could be concluded that a continuous process suitable for a large reactor could be devised in which the instantaneous concentration of soluble orthophosphate would be continuously suppressed at a low ppb level. The general requirements for the process are as follows:
1. A sufficient quantity of insoluble crystals must be present so that the dominant reaction is heterogeneous (and/or crystal growth) nucleation to form additional insoluble phase.
2. The local excess concentration of phosphate caused by the influent feed stream must be dissipated quickly by thorough stirring.
3. Flash mixing of phosphate feed and calcium hydroxide feed must be avoided. These two streams should enter the reactor at sites remote from each other.
4. For fast reaction, an excess of free calcium ion (over the required for the precipitation of calcium phosphate) must be maintained in the reactor.
5. Increase of pH increases the reaction rate. There must, however, be a concomitant increase in seed crystals to prevent the spontaneous formation of a more soluble phase.
6. Seed crystals, to be active, must be formed below 30°C.
7. Auxiliary provision must be included for settling, or otherwise, separating most of the seed crystals from the reactor effluent for return to the reactor.

The successful operation of a continuous flow process requires that the input rate of phosphate ions not exceed the rate of crystallization. Within this restriction, the highest feasible input rate becomes equal to the crystallization rate within the reactor, resulting in a steady-state concentration of dissolved phosphate ion. The actual steady-state concentration also depends upon the solubility of the solid phase which is being formed. If the steady-state concentration is being controlled largely by the input rate and the crystallization rate, stopping the phosphate input will result in a sharp drop in the concentration. If the steady-state is being controlled by the solubility of the solid, there will be no large decrease in concentration when the input is stopped. As a part of this invention, it has been found that the highest feasible input rate is critically dependent on the amount of seed crystals in the reactor and, within limits, proportional to the pH of the reactor solution. If the feed rate/crystal ratio becomes too high, a steady-state is not attained; the concentration of soluble phosphate increases continuously as more soluble solid phases of calcium phosphate form. The conversion of these relatively soluble phases to less soluble solid is slow. The free calcium content of the water must at least be such as to yield a calcium to phosphorus molar ratio of 1.5 to 1.75, plus a minimum excess of 0.2 millimoles per liter.

By repeated batch operations as in Examples 1–3 above, sufficient quantities of active seed crystals were obtained for testing the concept of continuous processing.

EXAMPLE 4

The 12 liter flask was charged with 9 liters of a suspension of the seed crystals containing the equivalent of 9 millimoles of phosphorus per liter plus an excess of soluble calcium ion of 0.5 millimoles per liter. The feed solution was dilute phosphoric acid neutralized to pH 5 to 6 with calcium hydroxide solution. The feed rate of phosphate solution was the equivalent of $1.3 \times 10^{-2}$ millimole of phosphorus per liter (of reactor solution) per minute. The pH was controlled throughout the course of the run by the addition of calcium hydroxide solution which served to neutralize hydrogen ions and to supply the additional calcium required for the formation of crystals having the composition of hydroxy apatite according to equation (4). The pH was controlled throughout at 10.0. A steadystate reaction was observed; i.e., the crystallization rate of calcium phosphate equalled the input rate of phosphate. Immediately after the feed had been terminated, the dissolved phosphorus level was 21 ppb. Fifteen minutes later, the level was down to 5 ppb. This implies that the residual dissolved phosphate (21 ppb) would decrease rapidly if the reactor effluent were to be passed into a settling device. The overall OH/HPO$_4$ molar reaction ratio in this run was 1.190 indicating that the solid composition corresponded approximately to the stoichiometry of reaction (3) above.

The feed rate was normalized, in terms of a typical waste water containing 8 ppm of phosphorus per liter, to a reactor residence time, using the relationship:

$$t = 8V/fc$$

where $V$ is reactor volume in liters, $f$ is the input flow rate in liters, and $c$ is phosphorus concentration in ppm in the input stream. On this run, the normalized reactor residence time was about 20 minutes, thus establishing the feasibility of continuously reducing dissolved inorganic orthophosphate contents to low levels in a relatively short period of time.

The following Table I summarizes the results of a series of continuous, steady-state runs: column 1 is the controlled pH value; column 2 gives the amount of seed crystal charged to the reactor at the start of each run, calculated as millimoles of phosphorus per liter; column 3 gives the amount of free calcium in millimoles per liter in excess of the stoichiometric amount required to precipitate the phosphate present in the feed water, assuming the reaction of equation (4); column 4 is the phosphate feed rate; column 5 is the feed rate to seed crystal amount ratio; column 6 is the dissolved orthophosphate residual as phosphorus at the time of feed cut-off; i.e., the steady-state residual; column 7 is the residual a given amount of time (in parentheses) after feed cut-off; i.e., a measure of the residual to be achieved in a settling device before final effluent discharge into a waterway; and the last column is the normalized reactor residence time calculated as above.

The OH/HPO$_4$ reaction ratios in these runs varied from 1.2 to 1.6. These ratios are not necessarily the actual ratio of hydroxide ion reacted to phosphate ion removed from solution because the preexisting solid phase tends to absorb hydroxide ion, probably by ion exchange, in the pH range over 9.

TABLE I

| pH | Seed crystals (m-mole P/l) | Excess Ca$^{2+b}$ (m-mole/l) | Feed rate $\frac{\text{m-mole P}}{\text{l - min}} \times 10^3$ | Feed Seed | Final P (ppb) | Residual P (ppb) | Residence time (min) |
|---|---|---|---|---|---|---|---|
| 9.3 | 34.5 | 1.25 | 8.92 | 0.26 | 4 | 1 (10) | 25 |
| 9.4 | 24.0 | 1.25 | 8.95 | 0.37 | 60 | 15 (18) | 29 |
| 9.7 | 13.6 | 0.41 | 12.75 | 0.94 | 38 | 28 (18) | 22 |
| 9.7 | 16.6 | 1.03 | 11.35 | 0.68 | 18 | 5 (25) | 25 |
| 9.7 | 4.02 | 1.19 | 1.92 | 0.48 | 59 | 8 (5) | 141 |
| 9.7 | 15.4 | 1.05 | 2.03 | 0.13 | 8 | 8 (5) | 133 |
| 10.1 | 10.6 | 0.41 | 14.80 | 1.40 | 38 | 8 (19) | 17 |
| 10.1 | 8.27 | 0.66 | 11.78 | 1.42 | 9 | — | 24 |
| 10.1 | 20.9 | 0.21 | 10.65 | 0.51 | 58 | 10 (10) | 27 |
| 10.1 | 13.6 | 0.66 | 11.12 | 0.82 | 2 | 0.7 (4) | 28 |
| 10.1 | 18.8 | 0.42 | 12.71 | 0.68 | 5 | 3 (16) | 22 |
| 10.1 | 14.5 | 0.65 | 11.43 | 0.79 | 4 | 2 (35) | 25 |
| 10.1 | 15.6 | 1.25 | 15.12 | 0.97 | 13 | 0 (59) | 19 |
| 10.5 | 10.4 | 0.51 | 10.8 | 1.04 | 89 | 6 (10) | 25 |
| 10.5 | 10.5 | 0.48 | 9.08 | 0.86 | 9 | 0 (13) | 31 |
| 10.5 | 6.96 | 0.60 | 2.15 | 0.31 | 64 | 0.6 (20) | 125 |

It is clear from the above results, that residuals after discharge of the water from the reactor to a settling basis are substantially below 50 ppb of phosphorus, even when the steady-state residual at feed cut-off is above 50 ppb. Also, with few exceptions, the residence times are quite low and would indicate that the instant process is a quick, effective, method of removing most of the dissolved inorganic orthophosphate. For example, the process would be directly applicable to the removal of orthophosphate from waste streams derived from fertilizer productions. In addition limited studies indicate the potential of the process in the removal of orthophosphates from sewage effluent.

I claim:

1. A method for the continuous removal of dissolved orthophosphate from an aqueous medium which comprises:
    i. Adding to water containing a known amount of dissolved orthophosphate an amount of soluble calcium such that the molar ratio of calcium to phosphorus is at least about 1.5, plus at least about 8 milligrams per liter of calcium in excess of said amount, ii. Maintaining the pH of said water between 8.5 and 9.5, iii. Maintaining the temperature of the water at or below 30°C, iv. Allowing the dissolved orthophosphate to nucleate and to begin precipitating in the form of calcium phosphate solid, v. Charging a reactor region with a slurry of the calcium phosphate solid obtained in step (iv), vi. Introducing into the region a continuous flow of the aqueous medium to be treated, vii. Maintaining the pH in the region between about 9.3 and about 10.5, viii. Maintaining the soluble calcium content of the water within the reactor region at a level where the calcium to influent phosphorus molar ratio is at least about 1.5 plus at least about 0.2 millimoles calcium per liter excess, ix. Establishing a steady-state of approximately constant concentration of soluble phosphate by maintaining the ratio of the phosphate input rate to charged calcium phosphate solid amount at about $1.5 \times 10^{-3}$ or less, where the input is expressed as moles of phosphorous per liter of reactor volume per minute and the charged calcium phosphate solid amount is expressed as moles of phosphorous per liter of reactor volume whereby additional orthophosphate in the form of calcium phosphate solid particles is precipitated, and x. Separating the calcium phosphate solid particles from a reactor region effluent.

2. The method of claim 1, wherein the thus separated particles are returned to the reactor region at a rate such that the reactor calcium phosphate solid charge concentration remains at a suitable value.

3. The method of claim 1, wherein the molar ratio of calcium to phosphorus in step (i) is between 1.5 and 1.75 plus at least about 8 milligrams per liter of calcium in excess of said amount.

4. The method of claim 3, wherein the molar ratio of calcium to influent phosphorous is between 1.5 and 1.75 plus at least 0.2 millimoles calcium per liter excess.

5. The method of claim 4 wherein the pH is maintained in steps (ii) and (vii) by the addition of calcium hydroxide solution as required.

6. The method of claim 4, wherein the aqueous medium is substantially free of carbonate.

7. The method of claim 1, wherein the pH is maintained in steps (ii) and (vii) by the addition of calcium hydroxide solution as needed.

8. The method of claim 1, wherein the aqueous medium is substantially free of carbonate.

* * * * *